Figure 1:
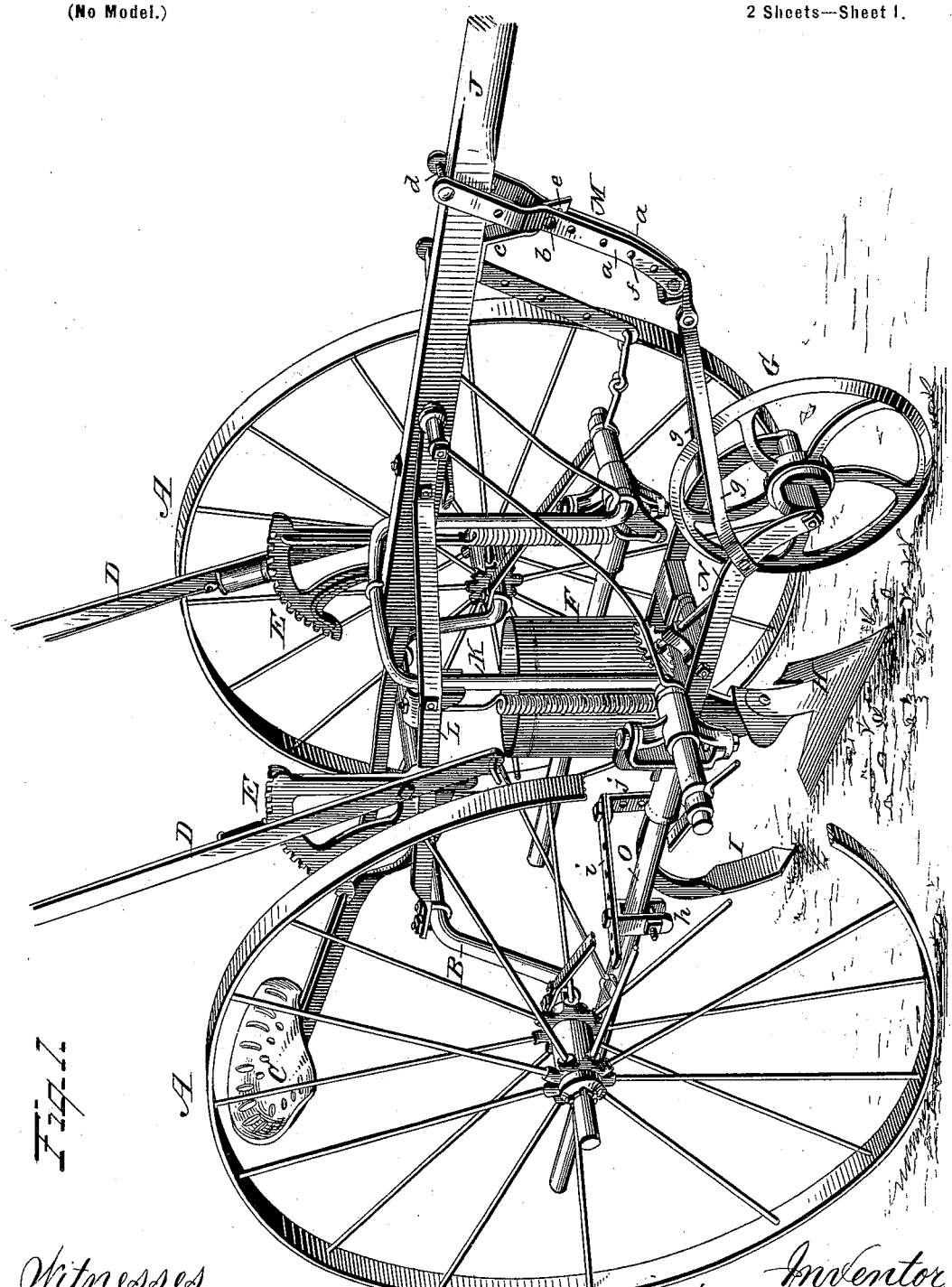

No. 618,519. Patented Jan. 31, 1899.
W. A. NORTON.
ATTACHMENT FOR CULTIVATORS.
(Application filed Sept. 30, 1898.)
(No Model.) 2 Sheets—Sheet 1.

Witnesses
Inventor
William A. Norton
per Chas. H. Fowler
Attorney.

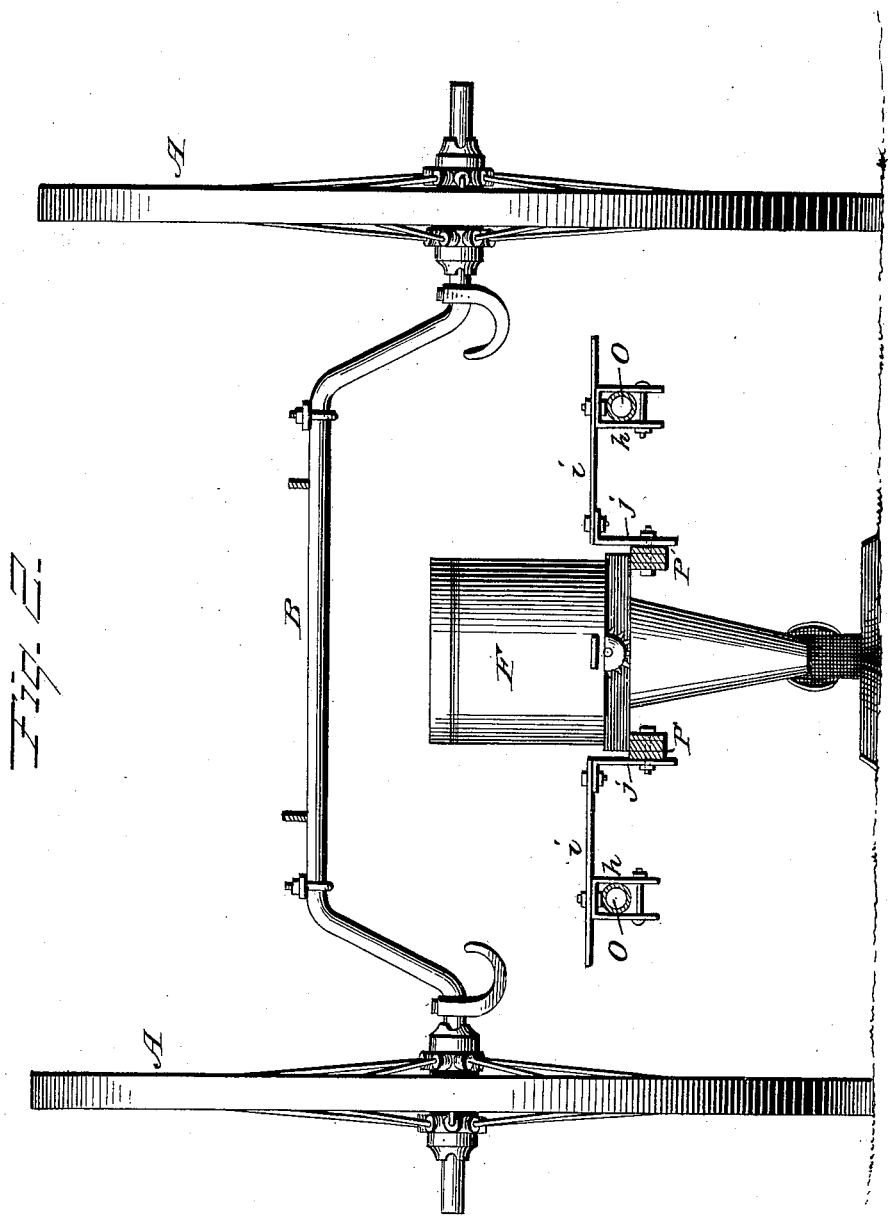

UNITED STATES PATENT OFFICE.

WILLIAM ANDERSON NORTON, OF McGREGOR, TEXAS.

ATTACHMENT FOR CULTIVATORS.

SPECIFICATION forming part of Letters Patent No. 618,519, dated January 31, 1899.

Application filed September 30, 1898. Serial No. 692,315. (No model.)

*To all whom it may concern:*

Be it known that I, WILLIAM ANDERSON NORTON, a citizen of the United States, residing at McGregor, in the county of McLennan and State of Texas, have invented certain new and useful Improvements in Attachments to Cultivators; and I do hereby declare that the following is a full, clear, and exact description of the same, reference being had to the annexed drawings, making a part of this specification, and to the letters of reference marked thereon.

The present invention has relation to that class of attachments to cultivators, plows, and other like agricultural machines in which means are provided for controlling and guiding the same through the tongue or pole connections.

The object thereof is to provide a simple, and effective, as well as strong and durable, attachment of the above character that can be conveniently applied to a cultivator, plow, or planter or other similar wheeled agricultural machine and that will successfully operate and may be easily controlled under all conditions and with effectiveness.

The invention consists in an attachment constructed substantially as shown in the drawings and hereinafter described and claimed.

Figure 1 of the drawings is a perspective view of a cultivator and planter, showing my improved attachment applied thereto; Fig. 2, a rear end view thereof, partly in section.

In the accompanying drawings, A represents the wheels of an ordinary cultivator and planter, and B the arched axle to which the wheels are suitably connected.

The seat C, the levers D, toothed segments E, also the seed-hopper F, the colter-wheel G, the plow H, and the cultivator-teeth I, as well as their several connecting parts shown in the drawings, need not be further described, as they are of the usual construction and common in this class of agricultural machines.

The tongue J is connected at its rear end to an arched support K and through the braces L to the crank or arched axle B. The tongue has also connected to it a front hanger M, consisting of two bars *a*, shaped in any suitable manner as will admit the hanger to fit onto any cultivator-tongue. The two bars *a* below the tongue come together and are secured by a suitable bolt *b*, which clamps them together and to the brace *c*. The upper end of the hanger M is forked or bifurcated, its ends embracing the tongue J and firmly connected thereto by the bolt *d*. The brace *c* has a series of perforations *e* to enable the hanger M to be adjusted to fit tongues that are of different perpendicular thicknesses. The brace *c* is not in any manner connected to the underside of the tongue J, but simply rests against the same and is retained in place by upward pressure and its connection with the hanger M, thereby avoiding injury to the tongue by bolt-holes or the customary fastenings.

The hanger M has a series of bolt-holes *f*, whereby the height of the plow, with colter-wheel, may be regulated by adjusting the arms G, which connect the frame N with the hanger.

The hanger M is slightly curved, so as to increase its effectiveness in different lengths of plows or planters by reversing the position of the hanger, thereby securing a greater distance between the lower end of hanger and the point of attachment to the plow.

The curved hanger M and its adjustability on the tongue J enables it to be changed in position to suit the operator.

To guide the plow or planter, and also to govern depth of same in operating, there is adjustably connected to the shafts O suitable clips *h*, and adjustably connected to these clips is a flat plates *i*, and to the inner ends of said plates is attached bracket *j*. The adjustability of the plates *i* may be secured by a series of holes in the plates for the reception of the connecting-bolt, or any other means may be provided to attain this adjustment. This adjustment of the plates *i* enables the attachment to be used in connection with wide or narrow plows or planters or wide or narrow rows. The brackets *j* are bolted firmly to planter beams or frame, as shown in Fig. 1 of the drawings, the brackets, the adjustable plate, and the clips forming together a hinge connection, so that the planter is enabled to move forward or backward. The brackets *j* are adjustable vertically through the perforations in the brackets and bolts, thereby enabling the back of plow to be raised or lowered and adjusting planter to suit cultivator-plows when in use.

The means above described in forming a connection between cultivator beams or shafts O and the planter frame or beams P admit of a free hinge motion forward and backward with comparatively little perpendicular movement. The hinge connection forms a parallel movement with planter or cultivator beams, allowing a freedom of motion from right to left and enabling the operator to guide the planter as he would a cultivator by pushing the beams from right to left with the feet.

In turning at ends of rows the planter is raised as the beams are raised, thus taking it completely out of the ground and rendering it impossible for an excitable horse or an unruly one to turn the planter over.

The attachment, consisting of the hanger M, being both adjustable and reversible and detachably connected to the tongue provides a simple and effective means that will possess strength and durability in forming a connection between the tongue and cultivator beams or shaft and the hinged and adjustable connection comprising the clips $h$, the plate $i$, and the brackets $j$, thereby performing a double function in allowing planter to swing back and be pulled by the tongue and hanger without strain on the cultivator-beams, and also allowing a freedom of motion laterally in either direction. The attachment is equally applicable to any form of planter or any form of cultivator and is most practical on account of simplicity, durability, and strength in connecting the planter and cultivator together.

Having now fully described my invention, what I claim as new, and desire to secure by Letters Patent, is—

1. In an attachment to cultivators, an adjustable and reversible hanger M detachably connected to the tongue of the cultivator and comprising the curved and perforated bars $a$ bent to form a fork at the upper end of the hanger to embrace the tongue, and the brace $c$ adjustably connected to the hanger and retained in position by frictional contact with the under side of the tongue, and the arms $g$ adjustably connecting the frame N with the hanger, substantially as and for the purpose set forth.

2. In a cultivator attachment, the adjustable clips $h$, the adjustable plates $i$ and the adjustable brackets $j$ connected together and to the frame of the plow or planter, and the curved and adjustable and reversible hanger M, and intermediate means for adjustably connecting the frame N to the hanger, substantially as and for the purpose specified.

In testimony that I claim the above I have hereunto subscribed my name in the presence of two witnesses.

WILLIAM ANDERSON NORTON.

Witnesses:
T. J. HUNT,
Z. C. WEST.